United States Patent [19]

Frien

[11] Patent Number: 4,781,106

[45] Date of Patent: Nov. 1, 1988

[54] RETURN AIR BARRIER FOR MOTOR VEHICLES

[75] Inventor: Manfred Frien, Enkenbach-Alsenborn, Fed. Rep. of Germany

[73] Assignee: General Motors Corporation, Detroit, Mich.

[21] Appl. No.: 160,663

[22] Filed: Feb. 26, 1988

[51] Int. Cl.⁴ .............................................. B60H 1/26
[52] U.S. Cl. .................................. 98/2.18; 137/512.1; 137/856
[58] Field of Search ............................. 98/2, 2.18, 119; 137/512.1, 856

[56] References Cited

U.S. PATENT DOCUMENTS

| | | | |
|---|---|---|---|
| 1,005,098 | 10/1911 | Berendonick | 137/856 X |
| 3,059,562 | 10/1962 | Sturtevant et al. | 98/2.18 X |
| 3,405,968 | 10/1968 | Feles et al. | 98/2.18 |
| 4,257,458 | 3/1981 | Kondo et al. | 137/856 X |
| 4,667,578 | 5/1987 | Hagenah | 98/2.18 |

FOREIGN PATENT DOCUMENTS

| | | | |
|---|---|---|---|
| 2933372 | 3/1981 | Fed. Rep. of Germany | 98/2.18 |
| 3240291 | 5/1984 | Fed. Rep. of Germany | 98/2.18 |

Primary Examiner—Harold Joyce
Attorney, Agent, or Firm—R. L. Phillips

[57] ABSTRACT

A return air barrier for a system for ventilation of the passenger compartment of a motor vehicle has a closure flap made of a flexible low-density material suspended, and resting by its own weight against an inclined grid in the housing of the return air barrier, and during air flow moves against the direction of outflow into the closed position. Above the closure flap within its range of travel thereof, there are several hook-like webs mounted in such a way that at the height at which flapping begins, the flap touches the free end of at least one web and, with increasing air velocity, buckles in the lower edge region, adheres snugly to the webs and is held in an angular form.

3 Claims, 2 Drawing Sheets

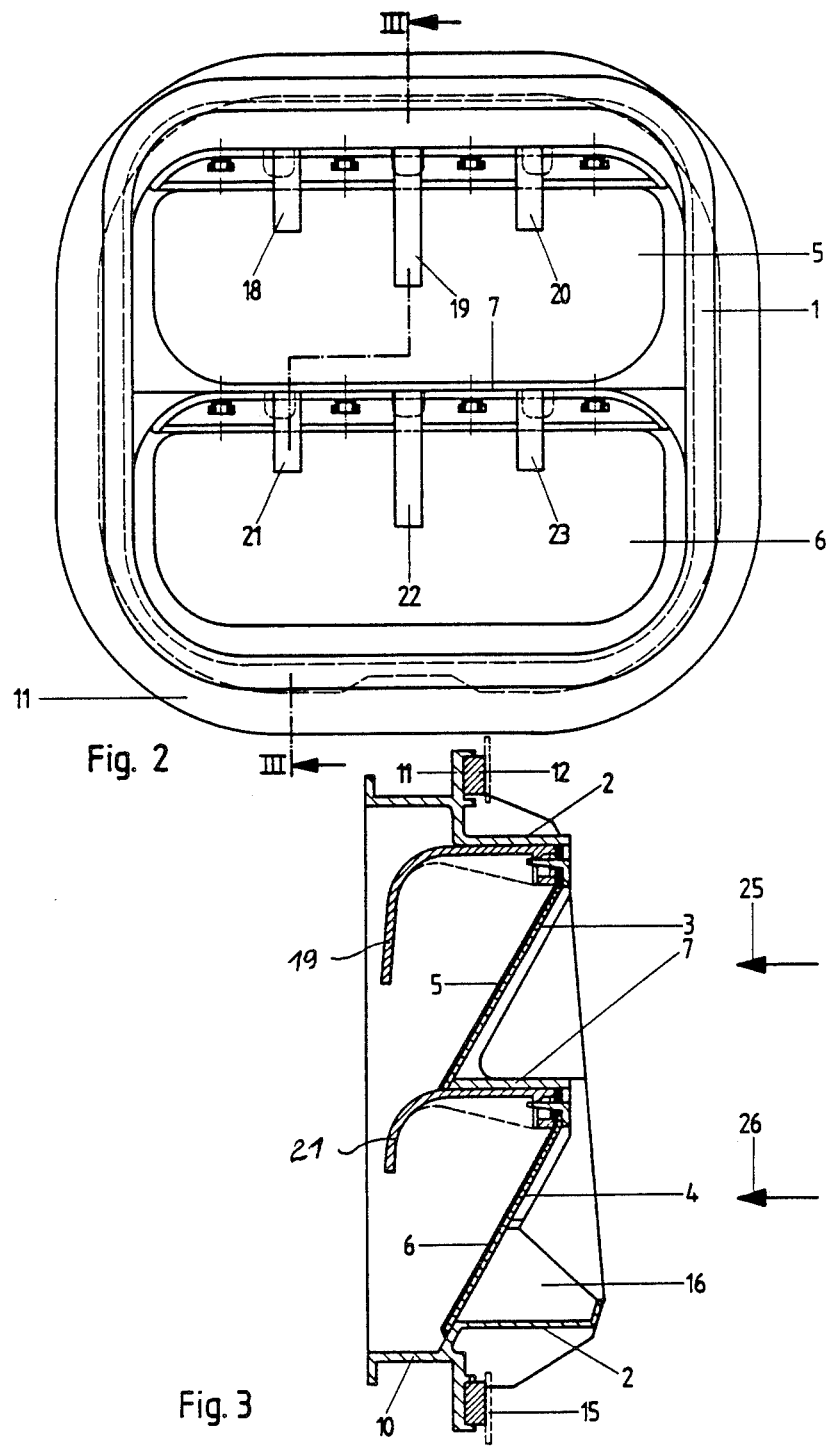

RETURN AIR BARRIER FOR MOTOR VEHICLES

TECHNICAL FIELD

The present invention pertains to a return air barrier for a system for ventilating the passenger compartment of a motor vehicle, whose closure flap made of a flexible low density material is suspended and rests by its own weight against an inclined grid in the housing of the return air barrier and during air flow moves against the direction of outflow into the closed position.

BACKGROUND OF THE INVENTION

When the ventilation air velocity is high, the conventional closure flaps of such return air barriers generate flapping noises which can be experienced as a nuisance in the passenger compartment of the motor vehicle.

SUMMARY OF THE INVENTION

The principal object of the present invention is to prevent these flapping noises. This is achieved according to the present invention by a plurality of hook-like webs disposed above the rectangular closure flap in its range of travel so that at the height at which the flapping begins the flap touches the free end of at least one web and, with increasing air velocity, buckles in the lower edge region, adheres snugly to the webs and is held in the angular form.

The webs according to the present invention serve as supports for the opened closure flap, so that the flap is no longer able to freely flap in the air flow, but is held by the webs and no flapping noises can therefore be generated.

An advantageous improvement of the present invention resides in the disposing of two closure flaps one above another in the housing of the return air barrier. Three curved webs are preferably mounted, spaced apart and adjacent to each other, in the upper edge region of the flaps, of which the middle web is longer than the other two.

DETAILED DESCRIPTION OF PREFERRED EMBODIMENT

Further characteristics and advantages of the present invention can be found in the following description and accompanying drawing of a preferred embodiment. In the drawing:

FIG. 2 shows a rear view of the return air barrier.

FIG. 3 shows a section along the line 3—3 in FIG. 2, wherein the open closure flap resting against the webs is indicated by a broken line.

Figure 1:
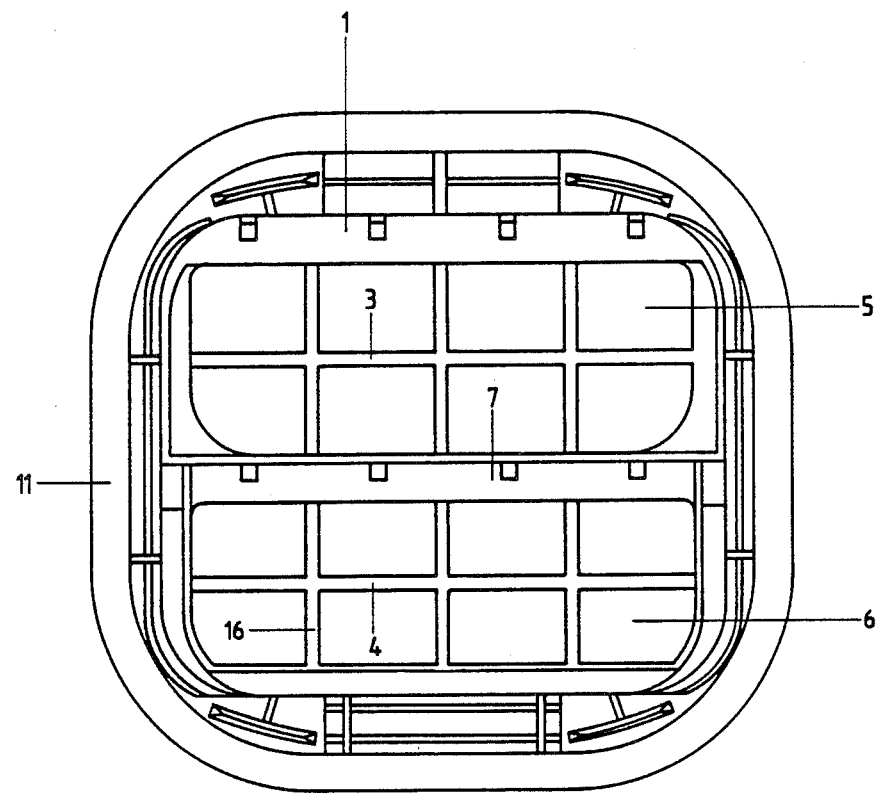
FIG. 1 shows a front view of the return air barrier.

The return air barrier consists of the frame-like plastic housing 1, in whose front part 2 inclined grids 3, 4 are disposed, which serve as supports for suspended closure flaps 5 and 6. The two grids 3 and 4 are connected to each other via the middle web 7. The front part 2 is joined by the rear part 10 which has a flange 11 with a sealing ring 12. The flange 11 serves for mounting the return air barrier in an opening of a wall 15 via the sealing ring 12, which is attached to the flange 11 and to the wall 15 with an adhesive. To ensure that the flaps 6 are firmly held, stiffening ribs 16 are disposed in the front part 2. Hook-shaped webs 18 through 23 reaching downward and into the range of travel of the said flaps 5 and 6 are located above the flaps. The middle webs 19 and 22 are longer than the other webs, so that the flaps 5 and 6, when they lift off from the grids 3 and 4, first touch the free ends of the webs 19 and 22. The webs 18 through 20 are attached in the upper region of the front part 2 together with the flap 5 while the webs 21 through 23 are disposed at the middle web 7 together with the flap 6.

During air flow in the direction indicated by the arrows 25 and 26, the flaps 5 and 6 lift off from the grids 3 and 4. At the height at which flapping begins, the flaps 5 and 6 touch the curved webs 19 and buckle in the lower edge region while the air velocity increases, adhere snugly to the webs 18 through 23 and are held in an angular position, so that flapping is no longer possible, and the noises associated with it cannot occur. The angular form of the flaps 5 and 6 is indicated by broken lines in FIG. 3. After cessation of the air flow, the flaps 5 and 6 drop back to their normal position on the grids 3 and 4.

The present invention has been explained above in greater detail on the basis of the embodiment shown in the drawing. However, it is obvious that the present invention is by no means limited to this embodiment, because there are many different possible modifications in the design of the individual parts and their arrangement without going beyond the scope of the present invention as defined in the appended claims.

The embodiments of the invention in which an exclusive property or privilege is claimed are defined as follows:

1. Return air barrier for a system for ventilation of the passenger compartment of a motor vehicle, whose closure flap made of a flexible low-density material is suspended, rests by its own weight against an inclined grid in the housing of the return air barrier, and during air flow moves against the direction of outflow into the closed position, characterized in that above the closure flap within the range of travel thereof, several hook-like webs are mounted in such a way that at the height at which flapping begins, the flap touches the free end of at least one web and, with increasing air velocity, buckles in the lower edge region, adheres snugly to the webs and is held in an angular form.

2. Return air barrier according to claim 1, characterized in that two closure flaps are disposed one above the other in the housing of the return air barrier.

3. Return air barrier according to claim 1 or 2, characterized in that the upper edge region of the flaps are mounted, spaced apart and adjacent to each other, three curved webs of which the middle web is longer than the other two.

* * * * *